US009888059B2

(12) United States Patent
Seay

(10) Patent No.: US 9,888,059 B2
(45) Date of Patent: Feb. 6, 2018

(54) METHODS AND SYSTEMS FOR SWITCHING BETWEEN SOFTWARE APPLICATIONS

(71) Applicant: Gordon E. Seay, San Diego, CA (US)

(72) Inventor: Gordon E. Seay, San Diego, CA (US)

( * ) Notice: Subject to any disclaimer, the term of this patent is extended or adjusted under 35 U.S.C. 154(b) by 538 days.

(21) Appl. No.: 13/840,662

(22) Filed: Mar. 15, 2013

(65) Prior Publication Data

US 2014/0280486 A1    Sep. 18, 2014

(51) Int. Cl.
*G06F 15/16*    (2006.01)
*H04L 29/08*    (2006.01)

(52) U.S. Cl.
CPC .............. *H04L 67/10* (2013.01); *H04L 67/02* (2013.01)

(58) Field of Classification Search
CPC ................................ H04L 67/10; H04L 67/02
USPC ......................................................... 709/203
See application file for complete search history.

(56) References Cited

U.S. PATENT DOCUMENTS

| 6,460,071 | B1* | 10/2002 | Hoffman ..................... 709/203 |
| 7,447,781 | B2* | 11/2008 | Chan et al. .................. 709/228 |
| 7,496,954 | B1* | 2/2009 | Himawan ............... G06F 21/41 726/8 |
| 8,782,676 | B2* | 7/2014 | Dokovski et al. ............ 719/329 |
| 2003/0088617 | A1* | 5/2003 | Clark ...................... G06F 9/465 709/203 |
| 2003/0189599 | A1* | 10/2003 | Ben-Shachar ........ G06F 3/1454 715/790 |
| 2005/0097008 | A1* | 5/2005 | Ehring ................... G06F 17/211 715/205 |
| 2006/0069596 | A1* | 3/2006 | Hatoun ................ G06Q 20/108 705/70 |
| 2006/0230343 | A1* | 10/2006 | Armandpour et al. ....... 715/517 |
| 2007/0070066 | A1* | 3/2007 | Bakhash ............. G06F 3/04815 345/419 |
| 2009/0024552 | A1* | 1/2009 | Klein ..................... G06N 5/025 706/47 |
| 2010/0250999 | A1* | 9/2010 | Ishizuka ................ G06Q 10/06 713/600 |

(Continued)

*Primary Examiner* — Kevin Bates
*Assistant Examiner* — Ronak Patel
(74) *Attorney, Agent, or Firm* — Schwabe, Williamson & Wyatt, P.C.

(57) ABSTRACT

Methods and systems relating to hosted applications, some examples of systems including storage units including computer executable code associated with a plurality of applications, data memories, wherein one or more of the applications include computer executable code configured to store previous location data associated with a saved location within the application, retrieve the previous location data, and direct the client computer to the saved location. Some examples of methods include transferring computer executable instructions associated with first applications to client computers, receiving requests from users to execute second applications, storing previous location data associated with saved locations within the first applications, transferring computer executable instructions associated with second applications to client computers, receiving a request from users to execute first applications, and transferring computer executable instructions associated with the first application to the client computer, including directing the client computer to saved locations associated with previous location data.

19 Claims, 7 Drawing Sheets

(56) References Cited

U.S. PATENT DOCUMENTS

| | | | |
|---|---|---|---|
| 2012/0096076 A1* | 4/2012 | Chan | 709/203 |
| 2013/0031462 A1* | 1/2013 | Calvo | G06F 9/545 |
| | | | 715/234 |
| 2013/0226554 A1* | 8/2013 | Dillard | G06F 17/289 |
| | | | 704/2 |
| 2013/0322665 A1* | 12/2013 | Bennett et al. | 381/300 |
| 2013/0346912 A1* | 12/2013 | Buening | G06F 3/0488 |
| | | | 715/783 |
| 2014/0059693 A1* | 2/2014 | Stecher | H04L 63/0421 |
| | | | 726/26 |

\* cited by examiner

METHODS AND SYSTEMS FOR SWITCHING BETWEEN SOFTWARE APPLICATIONS

BACKGROUND

The present disclosure relates generally to methods and systems for switching between software applications, such as hosted and/or network-accessible applications. In particular, methods and systems for managing state data to facilitate intelligent switching between hosted and/or network-accessible applications are described.

Switching between software applications is a procedure that software users will seek to perform many times in a given software session. For example, data from one application may be relevant to a task that needs to be performed in another application and quickly referencing each application may improve the user's workflow. However, known hosted applications, including cloud applications and software as a service ("SAAS") applications, do not enable users to conveniently and intelligently switch between different applications.

Many conventional hosted applications include a number of related pages or locations. For example, a hosted application accessible at a web address application1.publisher.com may include a first page accessed at application1.publisher.com/page1.aspx and a second page accessed at application1.publisher.com/page2.aspx. In conventional application frameworks, if a user returns to the hosted application after navigating away from it, the application framework is unable to direct the user to the last page the user accessed within the application when the user returns to the application.

For example, if the user accessed an application at application1.publisher.com/ after navigating away from application1.publisher.com previously, many conventional hosted applications would simply return the user to a default page rather than application1.publisher.com/page2.aspx. Returning a user to a default page instead of to a page corresponding to the page where the user was when he last accessed the application reduces the user's work efficiency and productivity by requiring the user to navigate to his former page when returning to the application. Further, conventional methods for managing multiple applications may waste resources by requiring users to open additional browser instances to navigate to other pages or other applications without losing their current place and configuration in the hosted application.

Additionally or alternatively, many conventional hosted application frameworks lack adequate means for users to navigate between applications in a group of related applications. For example, many conventional hosted application systems do not provide a means by which a user can select from a group of related applications and have the selected application load with the user focus directed to the precise location and software configuration that existed when the user navigated away from the selected application.

Further, many existing solutions do not adequately allow users to manage state data when switching between applications. Conventional hosted applications are not adequately aware of a user's interactions with other associated applications. As a result, conventional hosted applications in the web context require users to open a large number of browser instances to utilize multiple applications without losing state data associated with each application. As a result, there exists a need for improved state management systems and methods to provide both application awareness and to satisfactorily return users to previously used locations when returning to applications used in the past.

Moreover, some conventional application switching means, such as simply navigating across unrelated pages with the hypertext transfer protocol, lack satisfactory state management features. As a result, developers and users often find it difficult to properly maintain state data across multiple applications, particularly when navigating between applications in groups of related applications. This is particularly troublesome for applications accessed at distinct subdomains of the same domain. Thus, there exists a need for state data management solutions integrated into application switching frameworks that allow users to, in essence, pick up where they left off upon returning to work on a previously used application.

Additionally, some conventional hosted application solutions require software developers to develop a single code base to effectively switch between applications and/or manage state data within projects. Thus, there exists a need for modular application switching and state data management solutions. In particular, there exists a need for modular application switching and state data management frameworks that may be referenced by suites of independently developed applications. Such modular frameworks would greatly simplify the process of creating related groups of applications with a substantially consistent look and feel.

Thus, there exists a need for methods and systems for switching between hosted software applications and for methods that improve upon and advance the design of known state data management approaches. Examples of new and useful methods and systems relevant to the needs existing in the field are discussed below.

SUMMARY

The present disclosure is directed to methods and systems for switching between hosted software applications. Some system examples include a network connected application server and a state data memory unit. The application server includes a storage unit storing a plurality of applications and is configured to transfer an application in the plurality of applications to a client computer in network communication with the application server. One or more of the applications include computer executable code configured to store previous location data associated with a saved location within the application, retrieve the previous location data, and direct the client computer to the saved location.

Some examples of methods include transferring a first application to a client computer, receiving a request from a user to execute a second application, storing previous location data associated with a saved location within the first applications, transferring a second application to a client computer, receiving a request from the user to execute the first application, and transferring the first application to the client computer, including directing the client computer to the saved location within the first application associated with the previous location data.

DETAILED DESCRIPTION

The disclosed systems and methods will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various systems and methods are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Figure 1:
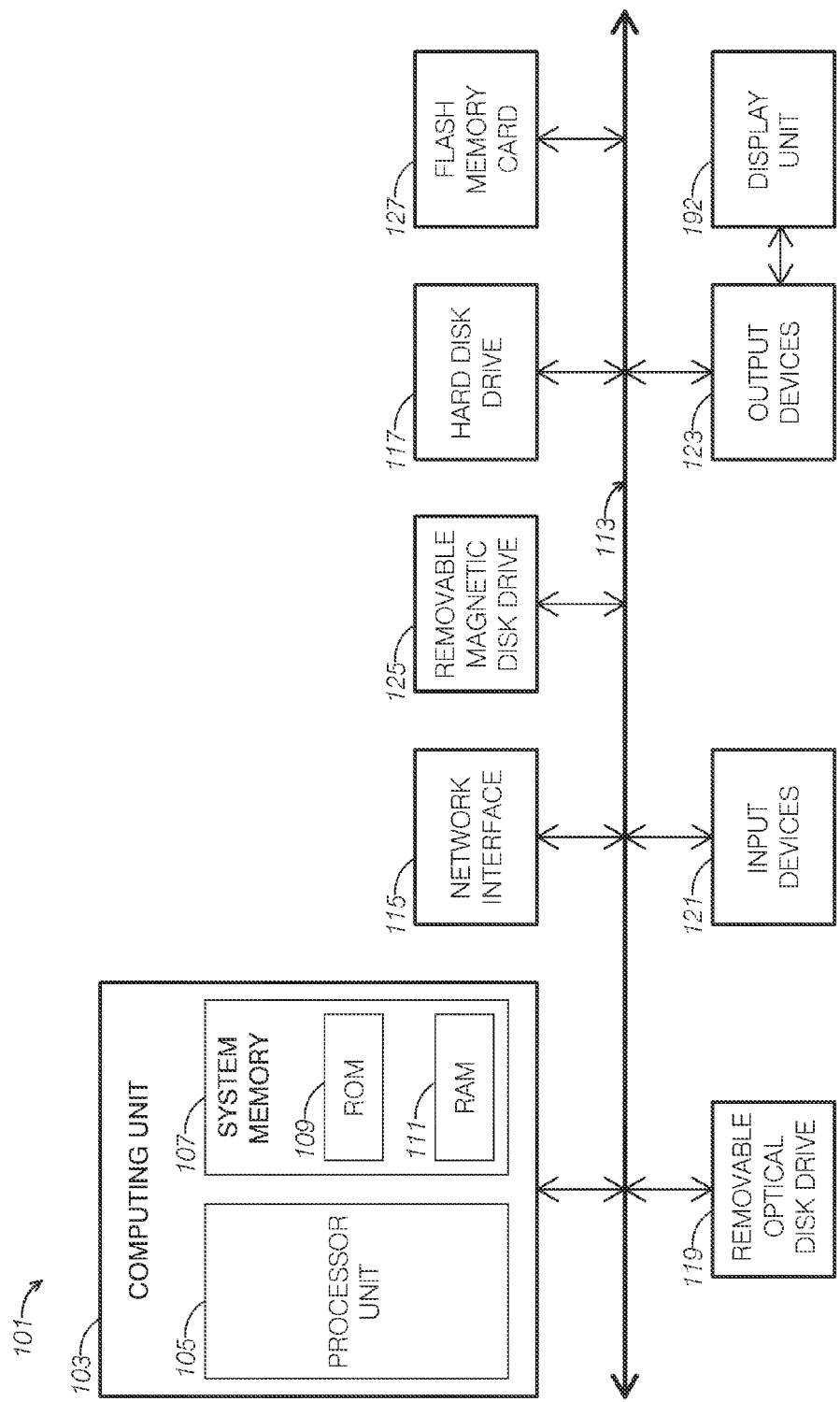
FIG. 1 shows a schematic view of an example of a programmable computing device.

Accordingly, FIG. 1 shows one illustrative example of a computer 101 that can be used to implement various embodiments of the invention. Computer 101 may be incorporated within a variety of consumer electronic devices, such as personal media players, cellular phones, smart phones, personal data assistants, global positioning system devices, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or more output devices 123. Input devices 121 may include, for example, a keyboard, touch screen, a remote control pad, a pointing device (such as a mouse, touchpad, stylus, trackball, or joystick), a scanner, a camera or a microphone. Output devices 123 may include, for example, a display unit 192, such as a monitor display, an integrated display, or a television; a printer; a stereo; or speakers.

Still further, computing unit 103 will be directly or indirectly connected to one or more network interfaces 115 for communicating with a network. This type of network interface 115, also sometimes referred to as a network adapter or network interface card (NIC), translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof. For example, the computer 101 may be connected to a digital music player, such as an IPOD® brand digital music player or iOS or Android based smartphone. As known in the art, this type of digital music player can serve as both an output device for a computer (e.g., outputting music from a sound file or pictures from an image file) and a storage device.

In addition to a digital music player, computer 101 may be connected to or otherwise include one or more other peripheral devices, such as a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their data maintained may be synchronized.

Of course, still other peripheral devices may be included with or otherwise connected to a computer 101 of the type illustrated in FIG. 1, as is well known in the art. In some cases, a peripheral device may be permanently or semi-permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 101 may include a wireless data "port," such as a Bluetooth® interface, a Wi-Fi interface, an infrared data port, or the like.

It should be appreciated that a computing device employed according various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

In many examples, computers may define mobile electronic devices, such as smartphones, tablet computers, or portable music players, often operating the iOS, Symbian, Windows-based (including Windows Mobile and Windows 8), or Android operating systems.

Figure 2:
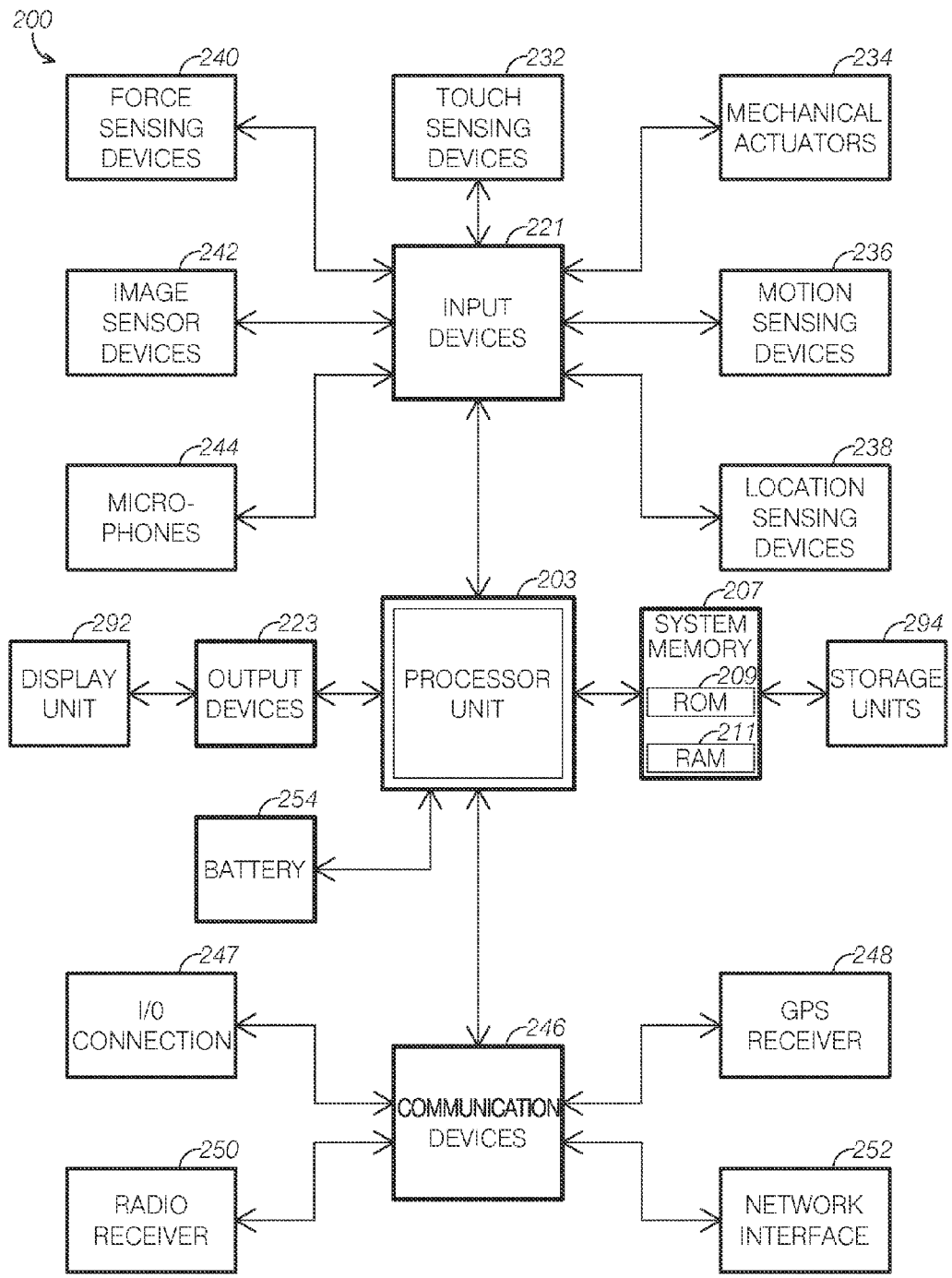
FIG. 2 shows a schematic view of an example of a mobile electronic device.

With reference to FIG. 2, an exemplary mobile device, mobile device 200, may include a processor unit 203 (e.g., CPU) configured to execute instructions and to carry out operations associated with the mobile device. For example, using instructions retrieved for example from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well known operating systems such iOS, Symbian, Windows-based (including Windows Mobile and Windows 8), or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203. Input devices 221 are configured to transfer data from the outside world into mobile device 200. As shown, input devices 221 may correspond to both data entry mechanisms and data capture mechanisms. In particular, input devices 221 may include touch sensing devices 232 such as touch screens, touch pads and touch sensing surfaces, mechanical actuators 234 such as buttons or wheels or hold switches, motion sensing devices 236 such as accelerometers, location detecting devices 238 such as global positioning satellite receivers, WiFi based location detection functionality, or cellular radio based location detection functionality, force sensing devices 240 such as force sensitive displays and housings, image sensor devices 242, and microphones 244. Input devices 221 may also include a clickable display actuator.

Mobile device 200 also includes various output devices 223 that are operatively coupled to processor unit 203. Output devices 223 are configured to transfer data from mobile device 200 to the outside world. Output devices 223 may include a display unit 292 such as an LCD, speakers or jacks, audio/tactile feedback devices, light indicators, and the like.

Mobile device 200) also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Figure 3:
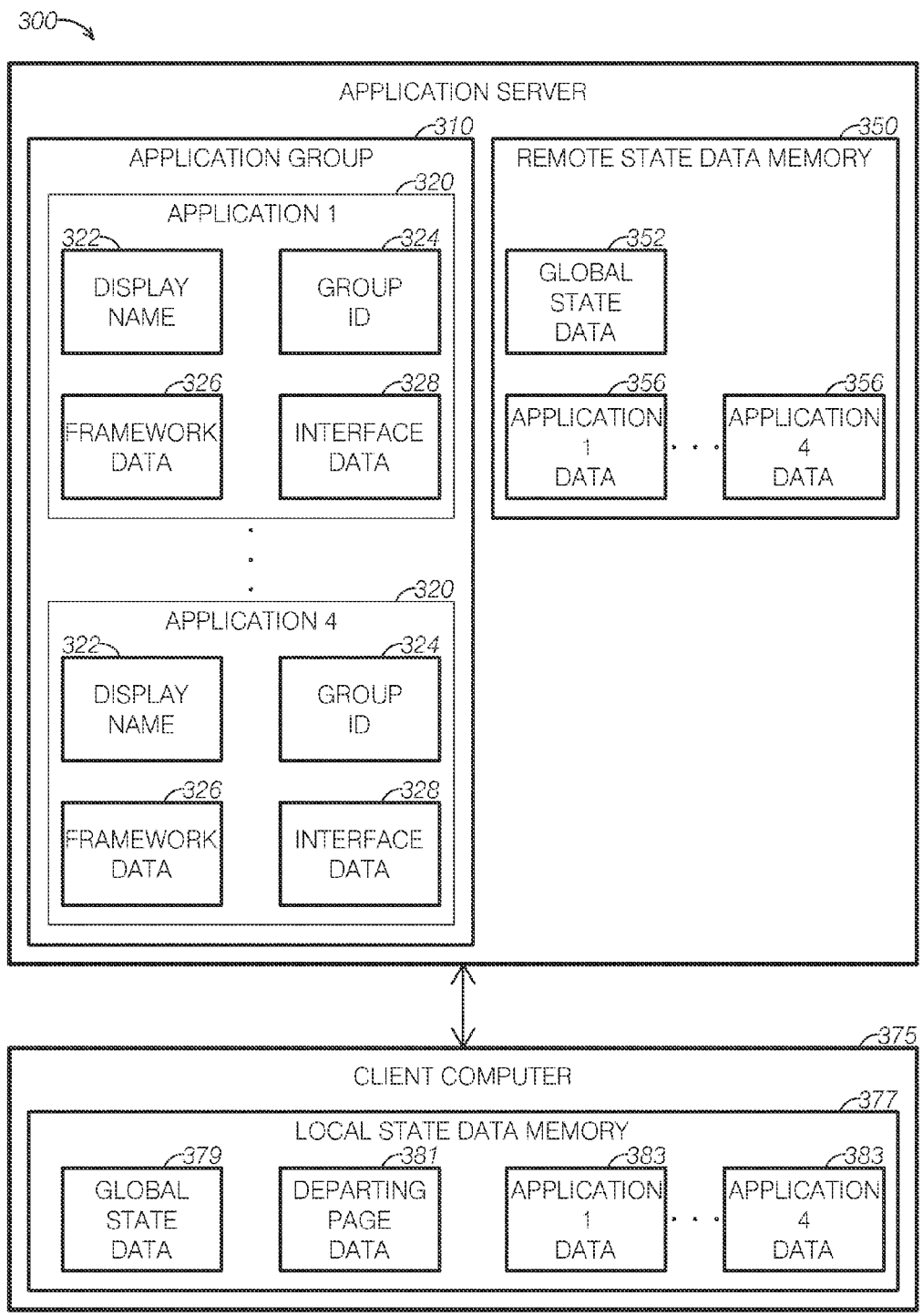
FIG. 3 shows a diagrammatic view of an application server and a client computer.

FIG. 3 illustrates an example data organizational structure used in some examples of the disclosed methods. As FIG. 3 illustrates, some examples include an application server 300 and a client computer 375.

In some examples, application server 300 defines one or more web servers hosting web applications on a network-connected computing device, substantially similar to computer 101 or mobile device 200. In some examples, application servers may define multiple clustered computing devices rather than a single computing device. For example, application servers may define web server clusters configured to cooperate to serve web content to client computers. Client computer 375 and application server 300 are connected to one another over a computer network, such as the internet, to allow data communication between one another. In some examples, client computer 375 is configured to retrieve and at least partially execute the hosted web applications, such as in a web browser.

In various examples, client computer 375 may define a computer, such as computer 101 or other electronic device configured to run software applications. For example, the client computer may be a desktop computer, a laptop computer, a mobile electronic device, such as a smartphone, a personal data assistant, or a tablet computer. The client computer may be any currently known or later developed computing device.

As FIG. 3 shows, application server 300 includes a storage unit that stores an application group 310 and a remote state data memory 350. In some examples, application groups and remote data memory may additionally or alternatively be wholly or partially stored in databases, memory, or other forms of digital storage.

As FIG. 3 shows, application group 310 includes one or more grouped applications 320, each including computer executable code configured to be transferred to and executed on a client computer in network communication with the application server. As FIG. 3 illustrates, each application 320 includes data structures storing information relating to the application, such as a display name field 322, a group ID field 324, a framework data field 326, and an interface data field 328.

In some examples, applications are web applications that include one or more of HTML layouts, scripts, compiled code, or other formats commonly used in hosted or client/server applications. Applications may be executed on clients, servers, or combinations thereof. In some examples, applications are able to access databases or other data references stored on servers, clients, or other network accessible computing devices. Applications may define hosted services, cloud computing applications, and/or additional or alternative technologies that provide software as a service (SaaS). In some examples, application servers host additional or alternative applications not included in application group 310.

In some examples, applications may define hosted applications, which are hosted on an application server. The application server may be configured to at least partially execute the hosted applications with a processor. Additionally or alternatively, the application server may be configured to transfer computer executable code associated with the hosted applications to a client computer in network communication with the application server. Further, the application server may be configured to store data associated with user input entered on the hosted applications on the storage unit.

While the hosted applications may be at least partially executed on the application server, executing the applications on the application server is not specifically required. In some examples, rather, the hosting application server simply transfers code to client computers and relies on the client computers to execute the applications.

Display name field 322 includes display name data identifying the associated application in a readily understandable, readable form. The display name data may, for example, be used in displays produced by the associated application or other applications grouped with the associated application to identify the application associated with the display data.

Group ID field 324 includes group identification data identifying the group with which the associated application is associated. Each of the applications in application group 310 includes consistent group identification data to easily identify member applications in application group 310.

In some examples, applications within groups do not include a discrete group 1D field that stores a unique identifier for the group and that is consistent among group members. Rather, the applications may include an additional or alternative group organizational structure. In some examples, applications each define members in an array or group of applications. In additional or alternative examples, applications define members of a class or other data structure commonly used in software development.

Framework data field 326 includes framework data associated with an application switching framework library. The application switching framework library provides groups of referencing applications with an application switching means having state management capabilities. For example, the state management capabilities of the application switching framework library may include returning to an application at the location and configuration used immediately prior to the last time a user navigated away from the application.

Further, the framework library may provide a substantially consistent look and feel across applications. The framework data is substantially consistent among each application 320 in application group 310. The framework data includes an application switching module and a framework interface module. As a result, the framework data provide each application in a group of applications with a substantially consistent, group-compatible interface for accessing and modifying shared state data.

In some examples, the framework data define APIs, headers, statically or dynamically linked libraries, or other structures designed to provide shared functionality among computer applications. In some examples, the framework data is manually inserted into an application's source code.

Each application switching module includes a state data management module including computer executable code for accessing and retrieving state data from a state data memory. In some examples, the state data includes previous application state data associated with prior application sessions and is shared among applications. Sharing state data among applications may include sharing state data between hosted applications included in a group of related applications. The related applications may define a cloud software suite with shared state data and a substantially consistent look and feel.

In order to allow elegant switching between applications, each state data module is configured to store and retrieve location data, such as previous location data, associated with a saved location within an associated application. The application switching framework may, for example, use the stored location data to allow a user to return to the saved location defined by the location data when returning to the application after navigating elsewhere. In some examples, the location data may include departing page data associated with a departing page of an application to which the client computer was pointed immediately prior to navigating away from the application. In some examples, the departing page data is stored automatically upon a user selecting to change to a desired application in the group of applications by selecting the desired application in an application switching element.

In some examples, applications define web applications accessible by a user on a client computer using a web browser. In such examples, the web applications may include a plurality of pages, each accessible by a uniform resource locator. In such examples, the location data may include a reference to the page, within the web application, to which the client computer was pointed as of the time the user navigated away from the application.

In some examples, the reference may define a uniform resource locator, though other reference formats capable of directing the client computer to the saved location are equally considered. The reference may, for example, include arguments passed to a script or application managing the application.

Location data may include user-specific previous location data that specifies a saved location to which a particular user was pointed when using the application. In some examples, the saved location further defines a location within a page (or other similarly navigable element of the application) to highlight more specifically where the user was working when the saved location was stored.

In some examples, client computers define mobile electronic devices, such as a smartphones or tablets. In such examples, the applications in a group of applications may be accessed using mobile applications specifically programmed for compatibility with application servers. In such examples, the mobile application may be used to navigate between applications in an application group hosted by the application server. The mobile application may, for example, have been downloaded from a mobile application store prior to use. In such examples, it may not be appropriate to state that the mobile applications are hosted, but are rather executed on the mobile device and configured to store and read hosted data on a network connected application server. In examples wherein a mobile device is used to access the applications, location data may correspond to a specific activity or screen associated with the mobile application's interpretation of the applications.

In some examples, previous location data may refer to a location that is accessible through an argument passed to a page rather than a particular page itself. For example, a previous location may be accessed at "domain.com/redirect.aspx?MoveTo=LastUsedPage." In this example, the previous location may be defined entirely in terms of the argument passed to a page or application. This disclosure notes that other substantially equivalent location storage means may equally be stored in previous location data.

In some examples, application servers may be configured to direct users through one or more portal addresses, and the locations may be defined by passing arguments to the application accessed at the address, as described above. In some examples, application servers may host applications that direct all users through a single portal address, wherein all users navigate to different locations by passing different arguments to the single portal address. Similar to as described above, the previous location data may define an argument passed to the portal address.

In some examples, applications may be configured to redirect to locations other than previous locations upon switching to an application. For example, applications may be configured to store location data associated with a main page or other application-designated location within the application, regardless of the user's last location. In some examples, applications may designate such an application-designated location in response to user operations performed in the application during a user's previous use of the application. In some examples, applications may designate such an application-designated location automatically. In some examples, each application may always define such an application-designated location as a default location within the application. The application switching framework may be configured to retrieve the location data associated with the application-designated location and redirect users to the application-designated location upon returning to the application.

The previous location data may be used by the application switching module to return the user to the location at which the user was working the last time the user was working within the associated application. Returning the user to the prior location at which he was working may save time and increase efficiency, for example, by freeing the user of the requirement to manually navigate to the correct location within an application upon returning to an application. When using the application switching framework, or an application switching element implementing the same, the user may be returned to the previous location immediately after a single click.

State data may include previous application state data associated with applications that have previously been executed. In some examples, the previous application state data is associated with an application in the associated application group different than the one being executed. The previous application state data may be associated the same application being executed, allowing users to recover state data relating to the last time that the user navigated away from the application.

In some examples, state data includes saved versions of applications that denote the configuration of the associated application at the time the state data was stored. In some examples, this may be a saved version of a web page associated with an application. The saved versions may allow a user to restore an application to a substantially identical configuration of the application that existed previously when a user navigated away from the application.

The configuration details restored may include variables, form contents, currently visible locations of pages or contained elements, or other data associated with the applications' state upon the user navigating away from it. Restoring the saved version configuration may allow users to work as if they had never navigated away from the application.

State data management modules may be configured to store and retrieve state data in one or more state data formats. The state data management module may abstract and translate the location and format in which state data is stored, allowing developers to simply add state management features to their applications. With some example state data management modules, developers may access the state data in a substantially simplified manner, such as a single function call. In such example developer-friendly, abstract formats, developers may easily manage shared state data, such as through single function calls and variables, rather than large and complex routines and code modules. By incorporating an abstract state data process, the need for software developers to develop large, single code bases may be reduced.

This simplicity allows switching between applications, state management, and data sharing among applications in contexts where it was previously too complex to be practical or possible. For example, web applications are often unaware of other web applications and provide little practical means to allow users to quickly navigate between related, mutually aware applications without repeatedly losing his place. By using an application switching module and corresponding state data management module, a user may be able to intelligently switch between applications in a group of web applications. Further, the applications may be made aware of changes to other applications in the group, including those applications operating in different browser instances.

Awareness of changes to other applications allows applications within a group to be responsive to changes in other grouped applications, such as when a user enters user input data in another application in the same group. Additionally or alternatively, improved state data management and sharing may allow groups of applications to adopt a single authentication process allowing a user to simultaneously log in to the entire group and navigate between applications of the group without requiring additional authentication.

Further, conventional state data management systems unsatisfactorily share state data across applications compiled to be hosted on different domains or subdomains. By using a common framework as described herein, developers may enable application switching and state data management among associated applications regardless of their address.

In some examples, the state data management module is configured to store and retrieve state data in standard state data formats, such as cookies. Additionally or alternatively, state data interfaces may be configured to store and receive proprietary state data formats. In some examples, state data is stored on or within remotely hosted state servers, locally hosted state servers, application servers, database servers, hidden form fields, querystrings, cookies, or some combination thereof. State data management modules add a level of automation to managing disparate data structures and locations. Thus, state data management modules may make it easier to manage state data across applications. In particular, state data management modules may make it easier to manage state data across hosted applications included in a group of related applications defining a cloud software suite.

The framework interface module includes computer executable code associated with one or more shared interface elements. Because the shared interface elements are substantially consistent in an application group, they provide a substantially consistent look and feel across applications in the group. The shared interface elements may include, for example, a navigation element, a menu system, a login interface, or other features that help a group of related applications maintain a consistent look and feel. In some examples, the shared interface elements include color selections, color schemes, font types, font sizes, and other variables accessible to associated applications to conform to their associated groups' look and feel.

Interface data field 328 includes data associated with producing a display unique to that particular application. In some examples, the interface data includes browser executable code configured to display a user interface within a web browser operating on the client computer, such as in HTML, XML, or other interface defining formats. The interface data may incorporate some or all of the shared interface elements defined by the associated application's framework data.

Remote state data memory 350 is configured to store state data for an application at a location other than the client computer, such as application server 300. As FIG. 3 illustrates, remote state data memory 350 includes a global state data field 352 and application data fields 356.

Each application field may include unique application ID data that may be used to reference the associated application and/or its data. In FIG. 3, each application ID data indicates the identification of the associated application 320 and indicates that the application is a member of application group 310, but this is not specifically required. For example, tag values may additionally or alternatively be stored as one or more locally stored variables or a table that associates each tag value with its corresponding applications.

Remote state data memory 350 is at least partially accessible to each application 320 for reading and writing.

Each element of global state data stored in global state data field 352 is accessible to be read and written by each application 320 in application group 310. Global state data provides a simple means for allowing applications in application group 310 to dynamically adjust in response to other applications in its group. Further, global state data may simplify data sharing among grouped applications. In some examples, global state data includes variables or other data elements that are only accessible to a portion of the other applications within a group of applications.

Application data fields 356 include state data uniquely relating to their associated application. In some examples, application fields store previous location data associated with saved locations to which users were pointed during previous instances of the associated application. In some examples, application fields may store departing page data associated with saved locations to which users were pointed immediately prior to navigating away from the associated applications.

Application fields may include user-specific previous location data defining a plurality of previous location entries specific to a user. Each user-specific previous location entry may define a saved location to which a particular user was pointed during the last time the particular user accessed the application.

In some examples, the application field stores state data corresponding to a partial or fully saved version of the associated application or location therein. Each application field may include an application tag that identifies the associated application.

In some examples, application fields include one or more access specifiers that manage access of applications to data stored in associated application fields. For example, an access specifier may allow a first application to access either all or a portion of the state data stored in a corresponding field while not allowing a second application to access the associated state data.

Application data fields 356 may be useful, for example, for storing saved versions of each application. When a user returns to the application, the application's state data management module may retrieve the state data associated with that application and incorporate that state data into the application when displayed. As FIG. 3 illustrates, client computer 375 is in network communication with application server 300. Client computer 375 is configured to at least partially retrieve and execute applications from application server 300. Further, client computer 375 is configured to access and modify state data stored in a data memory associated with executed applications.

As FIG. 3 shows, client computer 375 includes a local state data memory 377 which stores state data in a substantially similar manner as remote state data memory 350 and is similarly accessible to client computer 375, application server 300, and applications executed thereon. As FIG. 3 shows, local state data memory 377 includes a global state data field 379, a departing page data field 381, and application data fields 383, each configured to store substantially similar information as the corresponding fields of remote state data memory 350. Local state data memory 377 is configured to store data locally.

The framework associated with application group 310 is configured to utilize both remote state data memory 350 and local state data memory 377 for state data storage purposes. The framework may, for example, automatically determine whether local or remote storage is more appropriate for a particular state data element, and store that state data in the appropriate location. For example, some state data elements may be particularly suitable for local state data storage, like simple state data stored in browser cookies, where others may be more suitable for remote state data management, such as more complex and/or security-sensitive state data state data more suitable for database storage.

Figure 4:
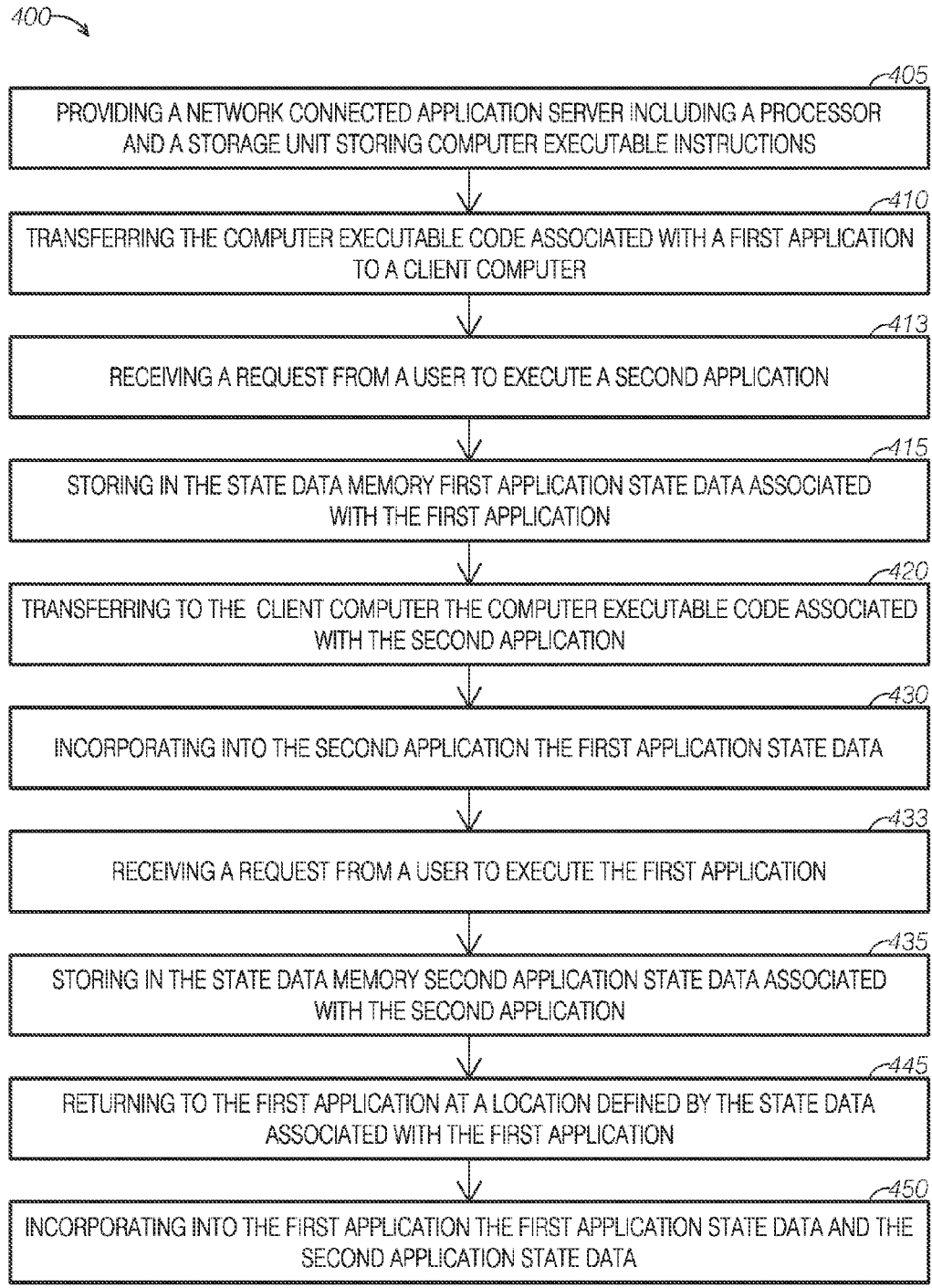
FIG. 4 is a flow diagram of a first example of a state data management method.

With reference to FIG. 4, an example of a state data management method, method 400, will now be described. As FIG. 4 shows, method 400 includes providing a network connected application server including a processor and a storage unit storing computer executable instructions at step 405 and transferring the computer executable code associated with the first application to a client computer at step 410. Method 400 further includes storing in a state data memory first application state data associated with the first application at step 415 and transferring to the client computer the computer executable code associated with the second application at step 420.

With further reference to FIG. 4, method 400 includes reading the first application state data and incorporating into the second application the read first application state data at step 430 and storing in the state data memory second application state data associated with the second application at step 435. Method 400 also includes returning to the first application at a location defined by the state data associated with the first application at step 445. Method 400 further includes incorporating into the first application the first application state data and the second application state data at step 450.

In some examples, method 400) is executed in the client/server configuration shown in FIG. 3, wherein client computer 375 is configured to communicate with application server 300 over a computer network and access applications hosted by application server 300.

As FIG. 4 shows, a network connected application server, substantially similar to application server 300, is provided at step 405. The network connected application server includes a processor and a storage unit.

In the storage unit, the network connected application server stores computer executable code relating to one or more applications configured to be transferred and at least partially executed on client computers, such as one of applications 320.

As FIG. 4 shows, computer executable code associated with the first application is transferred to a client computer, such as client computer 375, at step 410. In some examples, the computer executable code may define computer executable instructions for executing the first application. In some examples, the executable instructions include transferring browser-executable code configured to produce a display within a web browser on the client computer.

In some examples, the computer executable code is partially, primarily, and/or wholly executed on the server side. The code may be written in languages such as C#, Java, JavaScript, PHP, or Ruby and implement server-side technologies like ASP.NET or CGI. In examples where the application server primarily executes the computer executable code, the computer executable code transferred to the client computer includes browser executable code.

The browser executable code may include plain HTML and image files providing a cloud-accessible interface allowing users to operate the applications provided by the server-side applications. In particular, examples that are partially or primarily executed on the server side may be particularly suitable for cloud computing contexts. In some examples, the server side applications can access and manipulate local state data memory, such as by including cookies in the computer executable code transferred to the client computer.

In some examples, the computer executable code is configured to be executed partially, primarily, and or wholly on a user's computer. The code may be written in a client-side executed markup language, such as HTML, a client-side-executed scripting language like Javascript, and/or a client-side executed compiled language like Java. When transferred, the computer executable code may be at least partially executed on the client computer to display a user interface on a display unit connected to the client computer.

As FIG. 4 shows, a request to execute a second application is received from a user at step 413. The user may request to execute the second application, for example, by selecting a visual representation of the second application in an application switching element displayed on the first application.

Upon retrieving the request from the user to execute the second application, the application switching framework may read previous location data associated with the second application from local or remote state data memory. The read previous location data may be used by the application switching framework to redirect to the second application at the location defined by the previous location data associated with the second application during the switching process to the second application.

As FIG. 4 shows, first application state data associated with the first application is stored in the shared state data memory at step 415. In some examples, storing the first application state data includes storing the first application state data in local state data memory 377. In some examples, storing the first application state data includes transferring the first application state data to application server 300 and instructing the server to store the state data in remote state data memory 350.

In some examples, the stored first application state data may include previous location data associated with a saved location to which the user was pointed within the first application when using the first application. The saved location may correspond to the location at which the user was pointed at the time the user selected the second application in the application switching element.

In web application examples, for instance, the saved location may reference a particular page within the first application's plurality of pages. Referencing a particular page may occur by using an associated uniform resource locator or other address within the first application at which the client was pointed at the time the user selected the second application in an application switching element.

Client applications may include framework data that includes a state data management module that manages storing state data associated with an application. In some examples, the state data management module abstracts and translates the state data format and location to simplify state management in development projects.

As FIG. 4 shows, computer executable instructions associated with the second application are transferred to the client computer at step 420. In some examples, the computer executable code may define computer executable instructions for executing the second application. In some cases, step 420 is executed substantially similarly to step 410, however the second application may define a distinct application in the group apart from the first application.

In some examples, the second application is a member of the same application group as the first application, such as application group 310. In other examples, the second application is a member of different group than the first application. The second application may include a substantially consistent and compatible framework for providing state data management and for providing a similar look and feel.

In some examples, however, the first application and second application define the same application. This may occur, for example, when a user returns to the first application after navigating away from it previously. When a user returns to the first application, he may like to continue working with the page in a substantially identical configuration as when he left it before. In such examples, the state data includes a saved version of the first application.

In some examples, the computer executable code associated with the second application may be transferred to the client computer in response to the user selecting a visual representation corresponding to the second application in an application switching element displayed in the first application. In some examples, the second application may be automatically directed to a saved location according to stored previous location data associated with the second application and/or the current user.

As FIG. 4 shows, the first application state data is incorporated into the second application at step 430. In some examples, the second application produces a display, such as a user interface. The first application state data may be incorporated by displaying a display element, such as text, associated with the first application state data.

As FIG. 4 shows, a request to execute the first application is received from a user at step 433. The user may request to execute the first application, for example, by selecting a visual representation of the first application in an application switching element displayed on the second application. By requesting to return to execute first application, the user is able to return to the first application at the location he was pointed at the time he last navigated away from the first application.

Upon retrieving the request from the user to execute the first application, the application switching framework may read previous location data associated with the first application from local or remote state data memory. The read previous location data may be used by the application switching framework to redirect the first application to the location defined by the previous location data associated with the first application upon switching to the first application.

As FIG. 4 shows, second application state data is stored in the state data memory at step 435. The second application state data is stored in the state data memory in a substantially similar fashion to the first application state data being stored in the state data memory. Similar to the first application, previous location data associated with the second application may be saved at step 435. This previous location data may be used to restore the second application to the associated saved location upon a user returning to the second application at a later time As FIG. 4 shows, the user is returned to the first application at step 445. This may occur, for example, in response to a user selecting a visual representation of the first application on an application switching element displayed on one of the other applications in the same group of applications after the user navigates away from the first application. Returning to the first application at step 445 may include, for example, transferring computer executable instructions associated with the first application to the client computer and directing the client computer to a saved location associated with previous location data, the previous location data stored prior to navigating away from the first application at step 415. The saved location may correspond to the previous location data read at step 433.

As described above, the saved previous location data associated with the first application corresponds to a location within the first application. For example, the first application may define a root address of application1.publisher.com and a plurality of pages accessible, for example, at /page1.aspx, /submodule/subm.aspx, etc. The previous location data may point to the page in which the user was last pointed at the time the user navigated away from the application.

For example, the user may navigate to the second application using the application switching element while present at the location /submodule/subm.aspx within the first application, storing /submodule/subm.aspx in the previous location data as the saved location. Upon returning to the first application, the application switching framework redirects the user to /submodule/subm.aspx, according to the saved location. Additionally or alternatively, querystring variable data pertinent to that page may be preserved as part of the location data. This further enhances the state management capabilities of the framework. For example, the location being stored may be /submodule/subm.aspx?variable1=value&variable2=value.

The application framework may be easily referenced in a group of distinct, but related, applications, such as through a library, header, API, or other similarly modular software construct. The resulting applications may, as a result, be configured to allow switching between the other applications referencing the application switching framework while managing and sharing state data as provided by the application switching framework. Because the application switching framework may be modularly integrated into a wide variety of individually compiled applications, the disclosed switching methodologies may be implemented across a wide variety of applications without compiling a single large, unwieldy code base.

In examples where applications define web applications, utilizing the prior location data may include retrieving a uniform resource locator associated with the saved location. The user may be directed to the saved location by redirecting a browser operating on the client computer to the stored uniform resource locator associated with the saved location.

In some examples, the state management module reads state data from the state data memory and the retrieved state data is incorporated, either in whole or in part, into an output produced by the first application at step 450. In some examples, the framework's state data management module reads a saved version of the first application to allow a user to work with the first application in a substantially identical configuration as the last time the user navigated away. In some examples the framework's state data management module reads state data associated with the second application and incorporates data from the second application in to the first application.

The second application state data may be incorporated into the first application substantially similar to the second application incorporating the first application state data. This illustrates that the disclosed methods may provide applications with bi-directional state management functionality and application awareness.

In some examples, the framework's state data management module retrieves a portion of the first application state data and/or the second application state data and incorporates that data into the first application upon returning to the first application. The first application state data may allow the user to return to the first application in a substantially similar configuration as when he last left the application. The second application state data may allow the first application to be aware of changes in the second application state data and adjust according to changes made in the second application.

Figure 6:
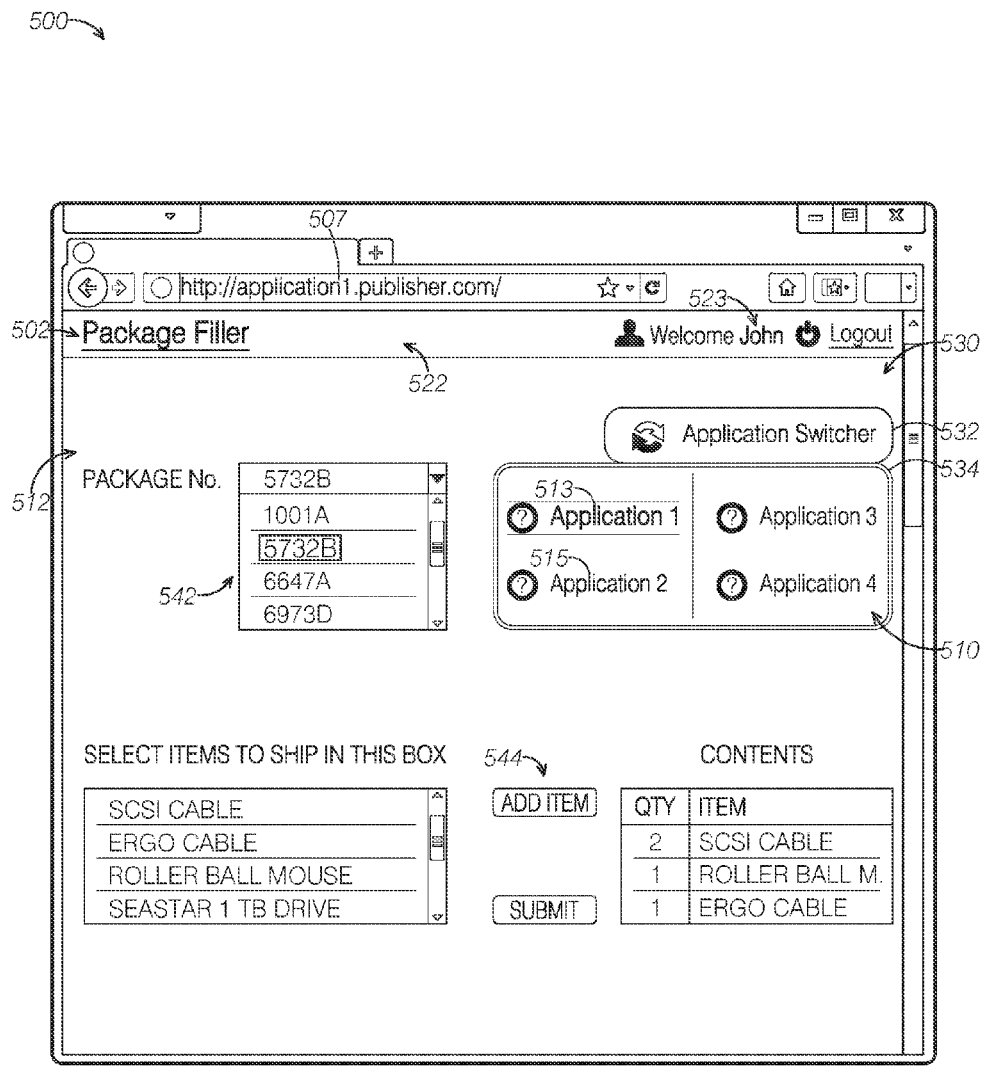
FIG. 6 is a screenshot of a first example of a user interface produced by an application according to the methods described herein.

FIG. 6 illustrates an example interface, interface 500, displayed by a first application 512. First application 512 is substantially similar to applications 320 and is included in an application group 510, which is substantially similar to application group 310. Interface 500 is displayed when code for displaying the interface is transferred and at least partially executed on a client computer. As FIG. 6 shows, interface 500 includes a web page 502 displayed in a browser instance of a web browser operated on the client computer.

First application 512 is hosted on an application server, substantially similar to application server 300, and is accessible to the client computer over an internet connection at a name server address 507 associated with an "application 1" subdomain of the "publisher.com" domain.

Like applications 320, first application 512 includes framework data associated with an application switching framework that is substantially consistent among applications in application group 510. The framework includes a state data management module and a framework interface module. First application 512 also includes interface data producing unique interface elements separate from the framework interface elements.

As FIG. 6 illustrates, the framework interface module of first application 512 displays a group of shared interface features including a heading 522, a login element 523, and an application switching element 530. Because these elements are defined in the framework interface module of first application 512, these elements are substantially consistent among each interface associated with application group 510.

Heading 522, in the displayed example, is relatively sparse including only the display name of the current application and login element 523. However, headings may include additional or alternative elements in some examples. In some examples, headings incorporate state data retrieved with the application's state data management module.

Figure 5:
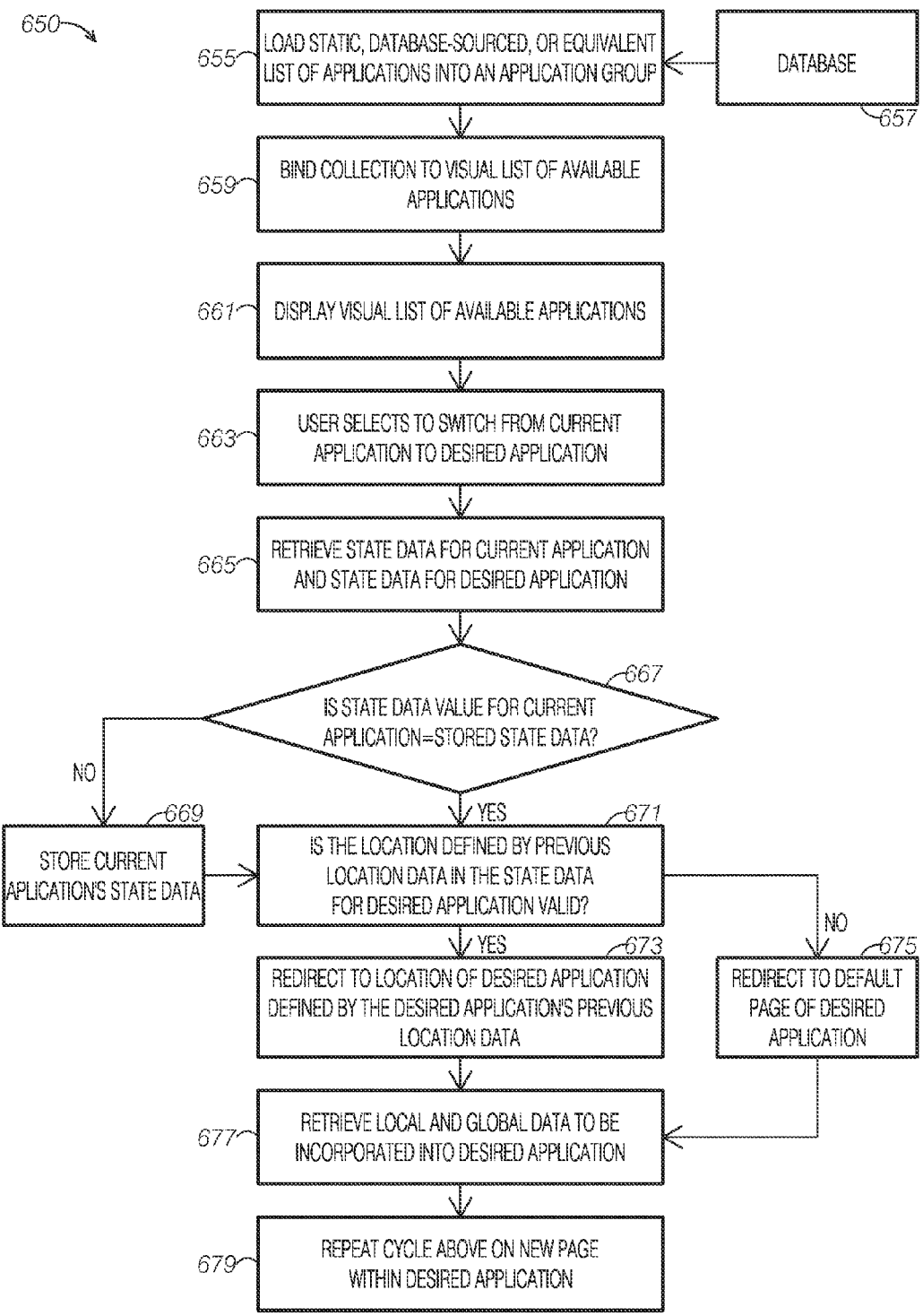
FIG. 5 is a flow diagram of a second example of a state data management method.

As FIGS. 5 and 6 show, heading 522 may include some application-specific elements while remaining substantially uniform across related applications. For example, heading 522 includes a display of the display name of the currently displayed application.

As FIG. 6 shows, login element 523 allows a user to remain logged in. When logged in, the user's login status is managed using the state data management module of first application 512. The login status may be stored in global state data in some examples, which may allow a user to remain logged in to all applications within an application group as the user navigates between applications in the group.

As FIG. 6 illustrates, application switching element 530 displays a list of application selectors relating to each application in application group 510 and navigates to a selected application in response to user manipulation. As FIG. 6 shows, application switching element 530 includes a display button 532 and a switching dialog 534. As FIG. 6 illustrates, a first application selector 513 associated with first application 512 is marked to indicate that it is the active application. Although first application selector 513 displays a relatively generic "Application 1" output, other application selector examples may display an associated application's display name.

FIG. 6 illustrates application switching element 530 in an open configuration where a user has selected display button 532 to display switching dialog 534. With switching dialog 534, the user may select an alternative application to activate the selected application. The user may activate the selected application by selecting second application selector 515.

When navigating to other applications, the state data management module of first application 512 may store state data associated with the current state of first application 512, such as described in methods 400 and/or 650. The user may additionally de-select display button 532 to hide switching dialog 534 to view elements of web page 502 without interference from the switching dialogue.

Upon selecting an alternative application using application switching element 530, the application's state data management interface may store previous location data. The previous location data may include a uniform resource locator associated with the current page within the first application. The locator may define, for example, "http://application1.publisher.com/page1.aspx" for the current state of the first application.

Previous location data may instruct the user's browser to direct to "http://application1.publisher.com/page1.aspx" upon returning to the first application, rather than to a default page or other page associated with the first application. For example, the first application may include a plurality of additional or alternative pages under the application1.publisher.com/ root directory or subfolders, additionally including "page2.aspx," "page3.aspx," "page4.aspx," and so on.

Other examples may have simplified addresses. For example, the previous location data may simply include an address that lists "page1.aspx," whereby the application server recognizes that the first application's pages will be located in the "http://application1.publisher.com/" root directory. In other examples, the previous location data may include arguments, variables, or other data indicating the location to which the client computer should be directed upon returning to the first application.

In some examples, the previous location data may further point to a particular location within a returned address rather than simply loading the appropriate address. For example, the client computer may scroll to a precise position on a page at the saved location, the precise position being substantially consistent with the position in which the user was viewing the saved location at the time the user navigated away. Additionally or alternatively, the previous location data may instruct the client computer to focus a cursor on a particular, last used element within the saved location, which may further streamline the user's ability to resume working with the first application.

Additional or alternative state data may additionally be saved to restore the displayed page of the first application in a substantially consistent configuration as when the user navigated away from the first application.

As FIG. 6 illustrates, first application 512 displays a plurality of interface elements defined in the interface data of first application 512, including a package selector 542 and an item selector 544. First application 512's state data management module may update these elements in response to changes applied in other applications in application group 510. For example, the interface elements may update by incorporating state data reflecting the other applications' changes. Additionally or alternatively, each of these interface elements may produce a default display that incorporates state data. The state data incorporated into the default display may reflect the state data of other applications or departing page data stored in a state data memory.

First application 512 displays an application allowing a user to select packages and insert items in selected package for shipping, but this example is merely illustrative and framework features are equally adaptable to other application types.

As FIG. 6 shows, package selector 542 allows a user to select a package; for instance, the user selected package "5732B" in the displayed example. The state data management module of first application 512 is configured to store state data in response to the package selected by a user. In some examples, the state data is stored at the time the user selects the package. In other examples, the state data is stored when the user navigates away from first application 512.

As FIG. 6 illustrates, item selector 544 is configured to associate items with a selected package. As FIG. 6 shows, item selector 544 is responsive to a user selecting a package with package selector 542. In some examples, an application is configured to retrieve other applications' data to appropriately display an element, such as item selector 544 or package selector 542, by incorporating the state data associated with another application in application group 510. An application may be configured to retrieve its own state data to appropriately display an element, such as item selector 544, incorporating the state data associated with another element in the same application, such as package selector 542.

Figure 7:
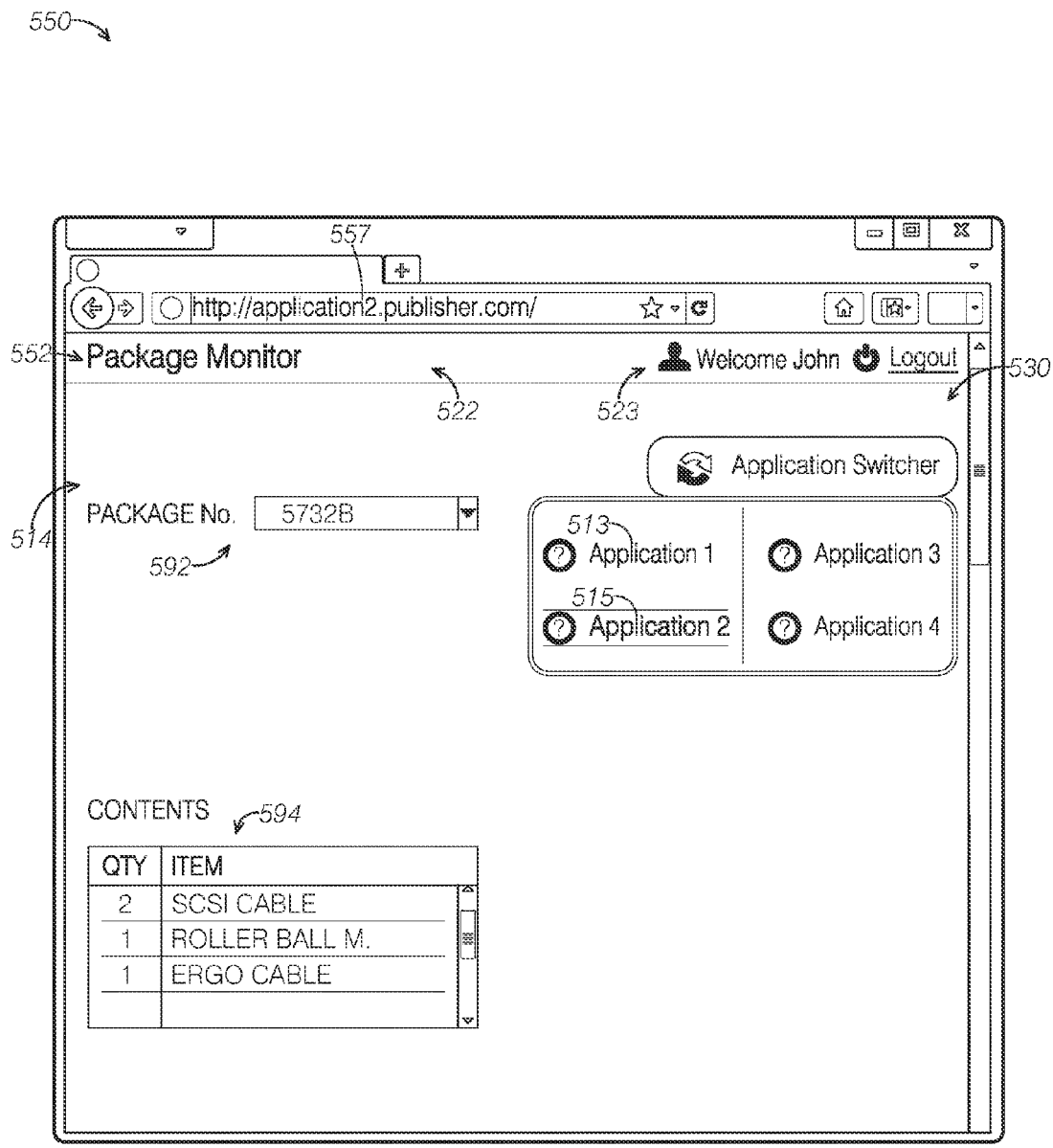
FIG. 7 is a screenshot of a second example of a user interface produced by an application according to the methods described herein.

FIG. 7 illustrates an additional or alternative example interface, interface 550, displayed by a second application 514, substantially similar to applications 320. Second application 514 is included in application group 510 with first application 512. As FIG. 7 shows, interface 550 includes a web page 552 displayed in the same browser instance as first application 512 in response to a user selecting a second application selector 515 in application switching element 530.

In some examples, the state data management features provided by the disclosed state data management modules allow users to fluidly navigate between applications in application group 510 in the same browser instance without the state data loss associated with conventional methods for browsing between unrelated browser pages. Allowing users to navigate between applications in the same browser instance may provide a myriad of benefits, including reducing the use of system resources, a cleaner interface, and less confusing navigation between applications.

Second application 514 is hosted on an application server, substantially similar to application server 300, and is accessible to the client computer over an internet connection at a name server address 557 associated with a "application 2" subdomain of the same "publisher.com" domain at which first application 512 was accessed.

Like applications 320, second application 514 includes with a framework substantially consistent among applications in application group 510. When loading, the state data management module of second application 514 may retrieve state data associated with other applications in application group 510 and instruct features of second application 514 to incorporate the retrieved state data.

As FIG. 7 illustrates, the framework interface module of second application 514 displays heading 522, login element 523, and application switching element 530 sharing a substantially consistent form with those of first application 512. As FIG. 7 shows, the displayed elements are substantially identical to those displayed in interface 500, save for marking to indicate that second application 514 is presently active.

Upon selecting an alternative application using application switching element 530, the application's state data management interface may store previous location data including a uniform resource locator associated with the current page within the second application, substantially as occurred when leaving the first application. This uniform resource locator may define, for example, "http://application2.publisher.com/page4.aspx" for the current state of the first application.

When returning to the first application, the application switching interface may automatically direct the user to the saved location stored at the time the user last left the first application using the application switching element. As described above, the previous location data corresponded to a saved location of "http://application1.publisher.com/page1.aspx." As a result, the application switching element is configured to return the user to that location upon returning to the first application.

Further, the state data management module is configured to restore the saved location to substantially the same configuration as when the user navigated away from the first application. For example, assuming the user navigated away from "http://application1.publisher.com/page1.aspx" in the configuration shown in FIG. 6, the user would return to substantially the same displayed page and configuration upon returning to the first application.

As FIG. 7 shows, second application 514 displays a package selector 592 that is substantially similar to package selector 542. Upon loading second application 514, the state data management module of second application 514 instructs package selector 542 to select the same package as was selected in first application 512 at the time the user navigated to second application 514. In some examples, the state data management module of second application 514 instructs package selector 592 to dynamically update to reflect user input data entered in first application 512, namely the current package selected in package selector 542.

As FIG. 7 illustrates, second application 514 displays a package contents display 594 configured to display the contents of the application selected in package selector 542. As FIG. 7 shows, the state data management module of second application 514 may instruct package contents display 594 to display the contents of the package selected in first application 512 at the time second application 514 is activated. Like package selector 592, the state data management module of second application 514 may instruct package contents display 594 to dynamically update to reflect the current package selected in package selector 542 in first application 512.

Though disclosure specifically discusses state data management in terms of switching from first application 512 and second application 514, examples are not limited to switching in this particular order. Indeed, switching from any application in application group 510 to any other application in application group 510 may result in a substantially similar management process.

With reference to FIG. 5, an additional or alternative example of a state data management method, method 650, will now be described. As FIG. 5 illustrates, method 650 includes loading a list of applications into an application group at step 655, binding the collection to a visual list of available applications at step 659, displaying a visual list of available applications at step 661, receiving user input to switch from a current application to a desired application at step 663, reading state data associated with the current application and state data associated with the desired application at step 665, determining whether the state data associated with the current application is substantially identical to the current configuration of the current application at step 667, storing the current application's state data in a state data memory state data associated with the current configuration of the current application if the current application has been changed at step 669, determining whether the state data associated with the desired application is valid at step 671, redirecting to a saved version of the desired application defined by the state data if the state data associated with the desired application is valid at step 673, redirecting to a default version of the desired application if the state data associated with the desired application is invalid at step 675, and resuming steps 661-675 with respect to the desired application at step 679.

As FIG. 5 shows, a list of applications is loaded into an application group at step 655. The application group may be substantially similar to application group 310, which may be loaded from a database 657 and may include a group of hosted applications included in a group of related applications defining a cloud software suite with shared state data and a substantially consistent look and feel.

The application group and/or collection of applications may be bound to a visual list of available applications in the application group at step 659. In some examples, this is accomplished by executing a framework interface module. The framework interface module may include instructions for displaying an application switching element with each of the members in an associated application group. The application switching element may be substantially similar to application switching element 530, which displays the elements of application group 510 in FIGS. 6 and 7.

The visual list of available applications is displayed at step 661. For example, FIGS. 6 and 7 illustrate application switching element 530 incorporating a group of applications.

A user selects to switch from a current application to a desired application at step 663. The user may perform this, for example, by clicking on an application in the list of applications displayed in FIGS. 6 and 7.

State data associated with the current application and/or state data associated with the desired application are retrieved from a state data memory at step 665. The state data may be retrieved, for example, with the state data management module of a given application.

In some examples, the state data retrieved at step 665 includes only a "last bookmarked page" associated with the current application. In such examples, the "last bookmarked page" may be used by the second application to determine whether any additional or alternative state data associated with the current application should be retrieved and incorporated by the desired application.

Whether the state data associated with the current application is substantially identical to the current configuration of the current application is optionally determined at step 667. At this step, the application determines whether an application's current state is different than the previously saved state of the application. By determining whether the page is in a substantially identical form, the application only overwrites the current application's state data if the user has modified anything in the associated application. Overwriting only when updates are made may conserve time and resources and may maintain a proper timestamp on the last time the current application was modified.

The current application's state data in a state data memory state data associated with the current configuration of the current application is stored at step 669. For example, the current application's state data may be stored if user modified the current application prior to selecting the desired application to retain state data to retain any such modification for future use. By storing the current application's state data, a user may access the current application at a later time and access the current application in a configuration substantially identical to a configuration saved when he, or another user, last left the page.

Whether the location defined by the previous location data in the state data associated with the desired application is valid is determined at step 671. The state data management module of the second application determines whether there is stored state data associated with the desired application prior to loading, allowing the user to access a saved version of the desired application from a prior instance of executing the desired application.

In some examples, the location defined by the previous location data is verified by checking for proper format and/or whether the associated location exists. For example, FIG. 6 illustrates that the associated application includes a location "http://application1.publisher.com/page1.aspx." Thus the location defined by previous location data corresponding to that address would be verified as valid. If the first application did not include a "fakepage.aspx" in its root directory, for example, previous location data resolving to "http://application1.publisher.com/fakepage.aspx" would verify as invalid.

The application server may verify the validity of the previous location data, for example, by scanning the locations associated with the application to return whether a location consistent with the previous location data exists. Additionally or alternatively, the application server may store an automatically updating location table associated with each application and compare the previous location data to the table entries. This may provide a particularly quick method of verifying the previous location data.

The user is redirected to the location of the desired application defined by previous location data if the location defined by the previous location data is valid at step 673. In contrast, the user is redirected to a default version of the desired application if the location data associated with the desired application is invalid at step 675. If the previous location data points to a valid location, the user returns to the previous location data's saved location upon returning to the desired application.

Returning a user to the saved location allows the user to continue working where he left off. By allowing users to continue where they left off, the disclosed systems increase the efficiency with which users can navigate between related applications. These location restoration features may be particularly useful in cloud/hosted application services, which conventionally do not allow easy navigation between different (though often related) applications.

As FIG. 5 shows, local or global state data to be incorporated into the desired application is retrieved at step 677. In some examples, the desired application may retrieve and incorporate global data, such as that stored in global state data field 352. In some examples, the desired application may retrieve data stored by other applications, such as the current application.

In some examples, the desired application may restore the local and global state data to restore the application to a substantially similar configuration as the time that the user last navigated away from the client application. At this stage, the desired application may additionally or alternatively incorporate data from other applications, making the desired application aware of changes to other related applications.

The desired application often retrieves this state data after a user's browser has been redirected to the desired application. Retrieving relevant state data after the browser redirect may, for example, properly allocate the retrieved state data in the desired application's memory rather than improperly allocating the retrieved state data in previously executed applications, such as the current application.

The desired application may retrieve this data, for example, by accessing data stored by the current application as global state data, such as in global state data field 352, or application-specific state data, such as in application data fields 356, to which the desired application has been given permission.

Some examples may include a related data flag associated with the desired application, which the current application may modify to instruct the desired application to retrieve state data associated with the current application upon loading. In some examples, the current application may have write access to the desired application's application-specific state data and may store state data relevant to the desired application therein. In some examples, each application may use the state data management module to access other applications' state data and/or global state data.

For example, the data received at step 655 in some examples includes only a "last bookmarked page" associated with the current application. At step 677, the desired application may interpret this "last bookmarked page" and retrieve state data associated with the current application that is relevant to the desired application. In some examples, the desired application may not retrieve any additional state data associated with the current application, such as when the desired application does not share one or more consistent interface elements with the current application.

After loading the desired page, steps 661-675 are repeated with respect to the desired application at step 679. At this stage, the desired application takes the place of the current application. As a result, the user may navigate between applications, saving the state as he navigates between applications and/or pages thereof.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A networked application system, comprising:
    a plurality of applications;
    a network connected application server including a storage unit, the network connected application server configured to:
        store the plurality of applications, and
        transfer one of the plurality of applications, or a portion of one of the plurality of applications to be executed on a client computer, to the client computer; and
    a state data memory unit in the client computer capable of being read and written to by each of the plurality of applications;
    wherein each of the plurality of applications includes computer executable code configured to:
        display a user interface within the application, the user interface enabling a user to switch between the application and a second application of the plurality of applications within a web browser operating on a client computer; and
        provide a framework library that includes an application switching module and a framework interface module, the framework library substantially consistent between each of the plurality of applications, the framework library further configured to perform the following steps upon a user switching between the application and the second application:
            store location data associated with a saved location within the application within the state data memory unit, the location data defining previous location data;
            retrieve from the state data memory unit second application location data associated with a second saved location that was stored by the second application; and
            direct the client computer in network communication with the application server to the second saved location in the second application.

2. The system of claim 1, wherein the application includes processor executable code configured to store the previous location data automatically upon a user navigating away from the application, the previous location data associated with a departing page to which the client computer was pointed immediately prior to navigating away from the application.

3. The system of claim 1, wherein:
    the application defines a first application;
    the second application in the plurality of applications includes processor executable code configured to direct the client computer to the first application; and the first application includes processor executable code configured to direct the client computer to the saved location in response to the second application directing the client computer to the first application.

4. The system of claim 1, wherein:
the browser executable code includes a plurality of browser executable pages; and
the previous location data includes an address pointing the client computer to the browser executable page of the application to which the client computer was pointed prior to the client computer navigating away from the application.

5. The system of claim 1, wherein:
the application defines a first application;
wherein the first application includes computer executable code configured to store, in the state data memory unit, first application state data associated with the first application; and
wherein the second application in the plurality of applications includes processor executable code configured to:
  retrieve the first application state data from the state data memory unit; and
  display on the client computer an output that incorporates the first application state data.

6. The system of claim 1, wherein:
the application defines a first application;
the first application is displayed in a browser instance of a web browser operated on the client computer and the first application includes computer executable code to instruct the web browser to display the second application in the plurality of applications in the browser instance.

7. The system of claim 1, wherein:
the application defines a first application;
the first application references computer executable code configured to:
  display, on the client computer, an application switching element, the application switching element including a visual representation of each application in the plurality of applications; and
  direct the client computer to the second application in response to a user selecting the visual representation of the second application.

8. The system of claim 7, wherein the first application includes computer executable code for automatically storing the previous location data associated with the first application in response to the user selecting the visual representation of the second application.

9. The system of claim 8, wherein the second application includes computer executable code configured to:
  display, on the client computer, the application switching element; and
  direct the client computer to the first application in response to the user selecting the visual representation of the first application in the application switching element;
  wherein the first application includes computer executable instructions configured to automatically direct the client computer to the saved location after the second application directs the client computer to the first application.

10. The system of claim 1, wherein each application in the plurality of applications references a framework that is substantially consistent among the plurality of applications, the framework including:

a state data management module configured to store and retrieve state data associated with a given application in the plurality of applications; and
a framework interface module configured to display an application switching element in the given application.

11. The system of claim 1, wherein:
the application defines a first application;
the first application is accessible at a first application address that resolves from a first subdomain of a primary domain; and
the second application in the plurality of applications is accessible at a second application address that resolves from a second subdomain of the primary domain.

12. The system of claim 1, wherein:
the application defines a first application;
each application in the plurality of applications references computer executable instructions associated with a state data management module, wherein:
  the state data management module, when referenced by the first application, is configured to store state data in a storage location accessible to the second application and to store state data in a storage format readable by the second application; and
  the state data management module, when referenced by the second application, is configured to retrieve the state data stored by the first application and incorporate the state data into the second application.

13. The system of claim 1, wherein the state data memory unit stores global state data accessible to every application in the plurality of applications.

14. A method for switching between applications in a plurality of applications executing within a client-server network including an application server and at least one client computer in data communication with the application server, the application server having a processor and a memory, comprising the steps of:
  transferring computer executable instructions associated with a first application of the plurality of applications to the client computer, with each of the plurality of applications, including the first application and a second application, including executable code that includes an application switching module and a framework interface module common to the plurality of applications and configured to display a user interface within each of the plurality of applications to enable a user to switch between the first application and the second application of the plurality of applications operating on a client computer;
  receiving a request through the application switching module of the first application from a user to execute the second application;
  storing into a state data memory unit by the application switching module of the first application previous location data associated with a saved location within the first application to which the first application was pointed prior to receiving the request from the user to execute the second application, such previous location data being readable by the second application;
  storing into the state data memory unit by the application switching module of the first application state data associated with a state of the first application prior to receiving the request from the user to execute the second application, such state data being readable by the second application;
  retrieving from the state data memory unit, by the application switching module of the first application, second application location data associated with a second saved location and second application state data that was previously stored by the application switching module of the second application;

transferring computer executable instructions associated with the second application including the application switching module and framework module to the client computer, the application switching module of the second application being configured to read the second application location data and second application state data retrieved by the application switching module of the first application;

displaying an adjusted state of the second application in response to the second application location data and second application state data;

receiving a request through the application switching module of the second application from the user to execute the first application; and transferring computer executable instructions associated with the first application to the client computer, including the application switching module of the second application retrieving from the state data memory unit the previous location data and state data, and directing the client computer to the saved location within the first application associated with the previous location data.

15. The method of claim 14, further comprising
storing state data associated with the first application; and
incorporating a portion of the state data associated with the first application in a display produced by the second application.

16. The method of claim 14, wherein the previous location data is associated with a departing location within the application to which the client computer is pointed immediately prior to receiving the request to execute the second application.

17. The method of claim 14, wherein the executable code for the application switching module further comprises:

displaying an application selection switching element on the client computer configured to execute the second application in response to the user selecting the second application with the application selection switching element;

transferring computer executable code associated with the second application from the application server to the client computer in response to the user selecting the second application in the application selection switching element; and storing previous location data associated with the first application in response to the user selecting the second application in the application selection switching element.

18. A networked application system, comprising:
a network connected application server including:
 a storage unit storing a plurality of hosted applications, the server being configured to:
  at least partially execute the hosted applications with a processor;
  transfer the hosted applications to a client computer in network communication with the application server; and
  store data entered by a user in the hosted applications on the client computer in the storage unit; and
a state data memory unit;
wherein each hosted application in the plurality of hosted applications includes processor executable code configured to:
 display the hosted application in a browser instance of a web browser operated on the client computer, the hosted application including computer executable code to instruct the web browser to display a second hosted application in the browser instance and a user interface within the hosted application to enable the user to switch between the hosted application and the second hosted application within the web browser;
 provide a framework library that includes an application switching module and a framework interface module, the framework library common between each of the plurality of hosted applications, the framework library further configured to perform the following steps upon a user switching between the hosted application and the second hosted application:
  prior to displaying the second hosted application, store the hosted application into the storage unit, and previous location data in the state data memory unit, the previous location data being associated with a saved location within the hosted application;
  retrieve the second hosted application from the storage unit and a second hosted application previous location data from the state data memory; and
  direct the client computer to display the second hosted application; and
  direct the second hosted application to a saved location associated with the second hosted application previous location.

19. The system of claim 18, wherein each hosted application is configured to display an interface within a web browser being operated on the client computer.

* * * * *